(12) United States Patent
Melanson

(10) Patent No.: US 7,647,125 B2
(45) Date of Patent: Jan. 12, 2010

(54) TIME-BASED CONTROL OF A SYSTEM HAVING INTEGRATION RESPONSE

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 143 days.

(21) Appl. No.: 11/864,366

(22) Filed: Sep. 28, 2007

(65) Prior Publication Data
US 2009/0085625 A1    Apr. 2, 2009

(51) Int. Cl.
G05B 11/01 (2006.01)
G05B 15/00 (2006.01)
H02J 3/14 (2006.01)
G08C 19/00 (2006.01)

(52) U.S. Cl. ............... 700/14; 700/1; 700/11; 700/12; 700/13; 307/38; 307/39; 307/41; 307/141; 340/309.16; 340/309.4; 340/825.59; 340/825.7

(58) Field of Classification Search ............ 700/1, 700/11–14; 307/38–41, 141; 340/309.4, 340/304.16, 825.59, 825.7
See application file for complete search history.

(56) References Cited

U.S. PATENT DOCUMENTS

| | | | |
|---|---|---|---|
| 3,790,878 A | | 2/1974 | Brokaw |
| 3,881,167 A | * | 4/1975 | Pelton et al. ............... 367/190 |
| 4,075,701 A | * | 2/1978 | Hofmann ................... 702/116 |
| 4,476,706 A | * | 10/1984 | Hadden et al. ............... 73/1.07 |
| 4,697,210 A | * | 9/1987 | Toyota et al. ............... 348/71 |
| 5,383,109 A | | 1/1995 | Maksimovic et al. |
| 5,929,400 A | * | 7/1999 | Colby et al. ................ 187/393 |
| 5,946,202 A | | 8/1999 | Balogh |
| 7,158,633 B1 | * | 1/2007 | Hein .......................... 379/412 |
| 7,212,640 B2 | * | 5/2007 | Bizjak ......................... 381/106 |
| 7,272,585 B2 | * | 9/2007 | Nomura et al. ............... 706/26 |
| 7,289,054 B1 | * | 10/2007 | Watanabe ................... 341/156 |
| 7,331,226 B2 | * | 2/2008 | Feldman et al. ........ 73/379.01 |
| 2007/0231009 A1 | * | 10/2007 | Watahiki ..................... 399/167 |
| 2008/0278132 A1 | * | 11/2008 | Kesterson et al. .......... 323/283 |

OTHER PUBLICATIONS

A 114-dB 68-mW Copper Stabilized Stereo Multibit Audio ADC in 5.62 mm2, Yang et al., IEEE, vol. 38, No. 12, pp. 2061-2068, Dec. 2003.*
Smedley et al; "One-Cycle Control of Switching Converters"; Power Electronics Group, California Institute of Technology, CA;1999 IEEE.
Doyle, John, et al; Feedback Control Theory; Macmillan Publishing Co., 1990.

* cited by examiner

*Primary Examiner*—Ramesh B Patel
(74) *Attorney, Agent, or Firm*—Dillon & Yudell LLP; Brian F. Russell

(57) ABSTRACT

A time-based controller provides control for a controlled system including a plant having an integration response. The time-based controller includes a comparator that detects a polarity change in a comparison of a sensed signal from the plant and a reference signal while a control signal is in a first state, time calculation logic that, responsive to detection of the change in the comparison, determines a time at which to change a state of a control signal supplied to the plant, and a modulator that, at the determined time, changes the state of the control signal supplied to the plant from the first state to a second state.

24 Claims, 4 Drawing Sheets

US 7,647,125 B2

TIME-BASED CONTROL OF A SYSTEM HAVING INTEGRATION RESPONSE

BACKGROUND OF THE INVENTION

1. Technical Field

The present invention relates in general to electrical circuits, and in particular, to time-based control of a system having an integration response.

2. Description of the Related Art

FIG. 1 is a high level schematic diagram of a prior art integrator circuit 100 including a switch 102, an integrator 104, and control logic 106. As shown, in response to a control signal 108 generated by control logic 106, switch 102 connects the input of integrator 104 either to an input A that causes integrator 104 to integrate up or to an input B that causes integrator 104 to integrate down. Control logic 106 generates control signal 108 based upon the output of integrator 104 and a target signal 110 in order to cause the average value of the output of integrator 104 to match target signal 110. In practice, integrator 104 often is not an ideal integrator having infinite DC gain, but is instead a "leaky" integrator having a finite DC gain.

Integrator circuit 100 of FIG. 1 can be realized in a variety of different applications. For example, one application of integrator circuit 100 of FIG. 1 is the prior art boost-mode switching regulator 200 illustrated in FIG. 2A. Boost-mode switching regulator 200 includes an inductor 204 of inductance L connected to a diode 212, and a capacitor 218 connected between diode 212 and a voltage rail 214. A DC voltage Vx exists between the input of inductor 204 and voltage rail 214, and a DC voltage Vcap characterizes capacitor 218. Boost-mode switching regulator 200 farther includes a switch 202 connected between voltage rail 214 and the common node 216 of inductor 204 and diode 212. In the depicted implementation, switch 202 intermittently shorts common node 216 to voltage rail 212 in response to a control signal 208 generated by control logic 206 based upon a sensed current signal 220 (i.e., the switch current) and a target current signal 210. Although in the depicted implementation, the sensed current is the switch current, in other common implementations the inductor or diode current is sensed. In still other alternative implementations, control logic 206 can control switch 202 based upon the sensed voltage (e.g., output voltage Vcap) and a target voltage signal.

During the shorting interval when switch 202 is closed, the current through inductor 204 integrates linearly at Vx/L amperes per second, assuming ideal components (e.g., diode, inductor and switch). When switch 202 is opened, the voltage reverses, and the current through inductor 204 decreases at a rate of (Vcap−Vx)/L amperes per second, again assuming ideal components. In this open state, the voltage across inductor 204 adds with the input voltage Vx present between the inductor input and voltage rail 214 to produce a voltage greater than Vx. Thus, boost-mode switching regulator 200 increases or "boosts" the input voltage Vx by an amount governed by the duty cycle of switch 202.

A second application of the integrator circuit of FIG. 1 is the prior art buck-mode switching regulator 250 depicted in FIG. 2B. Buck-mode switch regulator 250 includes a switch 252 connected to an inductor 254 of inductance L, and a capacitor 268 connected between inductor 254 and a voltage rail 264. A DC voltage Vx exists between the input of switch 252 and voltage rail 264, and a DC voltage Vcap that ranges between 0 V and Vx characterizes capacitor 268. As depicted, buck-mode switching regulator 250 further includes a diode 262 connected between voltage rail 264 and the common node 216 of inductor 254 and switch 252. Switch 252 opens and closes in response to a control signal 258 generated by control logic 256 based on a sensed current signal 260 and a target current signal 262. As noted above with respect to boost-mode switching regulator 200 of FIG. 2A, in alternative implementations control logic 256 of buck-mode switching regulator 250 may control switch 252 based upon the inductor or diode current, or alternatively, based upon a sensed voltage (e.g., output voltage Vcap) and a target voltage signal.

When switch 252 is closed, the voltage across the inductor is equal to Vx−Vcap, and the current through inductor 254 integrates up linearly at Vx/L amperes per second, assuming ideal components. No current flows through diode 262 due to the reverse-bias of Vx. When switch 252 is opened, diode 262 is forward biased, the voltage across inductor 254 is equal to −Vcap (neglecting diode drop), and the current through inductor 254 integrates down linearly at a rate of (Vcap−Vx)/L amperes per second, again assuming ideal components. Thus, buck-mode switching regulator 200 decreases or steps down the input voltage Vx by an amount governed by the duty cycle of switch 252.

Prior art designs of integrating circuits, such as switching regulators 200 and 250 of FIGS. 2A-2B, are characterized by control logic (e.g., control logic 106, 206 or 256) that varies the duty cycle of the switch based upon the relative magnitudes of the target signal and a sensed current or voltage signal.

For example, in one conventional feedback control methodology, the duty cycle of the switch in an integrator circuit is controlled by a control signal produced by comparing the magnitude of a target voltage signal with a reference sawtooth signal to achieve a duty cycle proportional to the difference between the target voltage signal and the output voltage Vcap. In one conventional current-mode control methodology, the control logic turns on the switch in response to a constant frequency clock pulse and turns off the switch when the sensed switch current is equal in magnitude to the target current. Both of these conventional control techniques are vulnerable to input voltage transients (e.g., from unregulated input voltage sources) and require at least several cycles to dampen the consequent oscillations in the output voltage. If current-mode control is employed, stabilizing the system may require additional substitution of an artificial downward sloping ramp for the sensed current signal.

A third control methodology known as One Cycle Control has been developed for applications having a constant switching frequency. In One Cycle Control, the control logic uses a constant frequency clock pulse to turn on the switch and uses an integrator to integrate a sensed voltage (e.g., the voltage of node 266 of buck-mode switching regulator 250). The control logic turns off the switch when a comparator indicates the integrated sensed voltage is equal to the target voltage signal. While One Cycle Control provides improved response to input voltage transients as compared to other control methodologies, the control logic required to implement One Cycle Control is unduly complex.

In view of the foregoing, the present invention appreciates that improved control for an integrating system would be useful and desirable.

SUMMARY OF THE INVENTION

In some embodiments, a time-based controller provides control for a controlled system including a plant having an integration response. The time-based controller includes a comparator that detects a polarity change in a comparison of a sensed signal from the plant and a reference signal while a control signal is in a first state, time calculation logic that, responsive to detection of the change in the comparison, determines a time at which to change a state of a control signal supplied to the plant, and a modulator that, at the determined time, changes the state of the control signal supplied to the plant from the first state to a second state.

BRIEF DESCRIPTION OF THE DRAWINGS

The present invention, as well as a preferred mode of use, will best be understood by reference to the following detailed description of one or more illustrative embodiments when read in conjunction with the accompanying drawings, wherein.

DETAILED DESCRIPTION OF ILLUSTRATIVE EMBODIMENT

Figure 3:
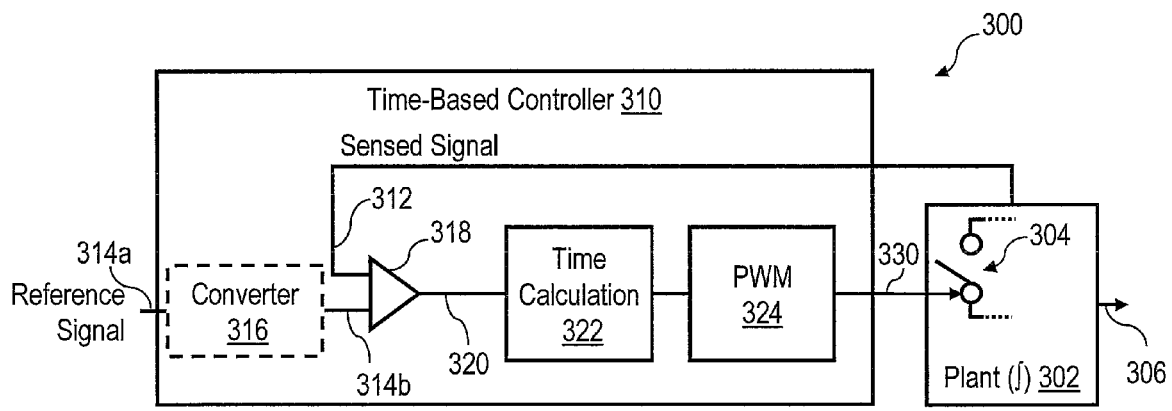
FIG. 3 is a high level block diagram of a controlled system in accordance with the present invention.

With reference now to FIG. 3, there is illustrated a high level block diagram of an exemplary controlled system 300 according to the present invention. As shown, controlled system 300 includes a plant 302 that at least substantially exhibits an integration response. Plant 302 thus comprises an ideal or leaky integrator. Plant 302 includes a switch 304 that governs the integration response of plant 302. As described in the integrator circuits discussed above, switch 304 has two states: an on (or closed) state in which switch 304 causes plant 302 to integrate up, and an off (or open) state in which switch 304 causes plant 302 to integrate down. Controlled system 300 further includes time-based controller 310 that controls switch 304 such that the output 306 (e.g., the output voltage) of plant 302 has a desired average value. Because the control applied to switch 304 by time-based controller 310 always causes plant 302 to integrate up or down, time-based controller 310 is said to apply bang-bang control.

As indicated by its name, time-based controller 310 implements a time-based control methodology, rather than one of the conventional magnitude-based control methodologies described above. Time-based controller 310 receives as inputs a sensed signal 312 indicative of a current or voltage in plant 302 and a reference signal 314a, such as an analog or digital current or an analog or digital voltage. Reference signal 314a may represent the desired (or target) average value of sensed signal 312 or a known offset from the target average value. Time-based controller 310 may optionally include a converter 316 (e.g., an analog-to-digital converter (ADC) or digital-to-analog converter (DAC)) to covert reference signal 314a to obtain a reference signal 314b of the desired format. The reference signal is hereinafter generically referred to as reference signal 314, which is intended to encompass both embodiments in which reference signal undergoes conversion and embodiments in which no conversion of reference signal 314 is performed.

Time-based controller 310 further includes a comparator 318 that receives reference signal 314 and sensed signal 312 and changes comparator output signal 320 to indicate when the value of sensed signal 312 crosses the value of reference signal 314 on at least one of the positive or negative transitions. Comparator output signal 320 is received by time calculation logic 322 that, responsive thereto, determines the time at which the state of switch 304 should be changed in order to maintain the average value of sensed signal 306 at the target average value. Finally, time-based controller 310 includes a pulse-width modulator (PWM) 324 that asserts or deasserts control signal 330 to change the state of switch 304 at the time indicated by time calculation logic 322.

As will be appreciated, a controlled system 300 in accordance with the present invention can be realized as a boost-mode switching regulator, a buck-mode switching regulator, or any other type of plant having an integration response to which bang-bang control can be applied.

Figure 1:
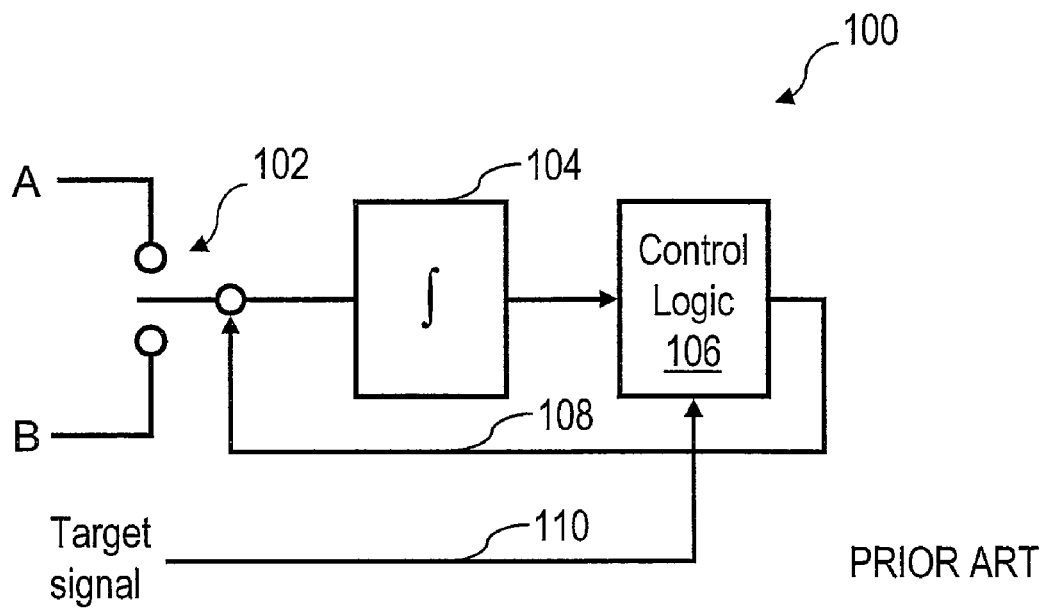
FIG. 1 is high level schematic diagram of a prior art integrator circuit.
Figure 2A:
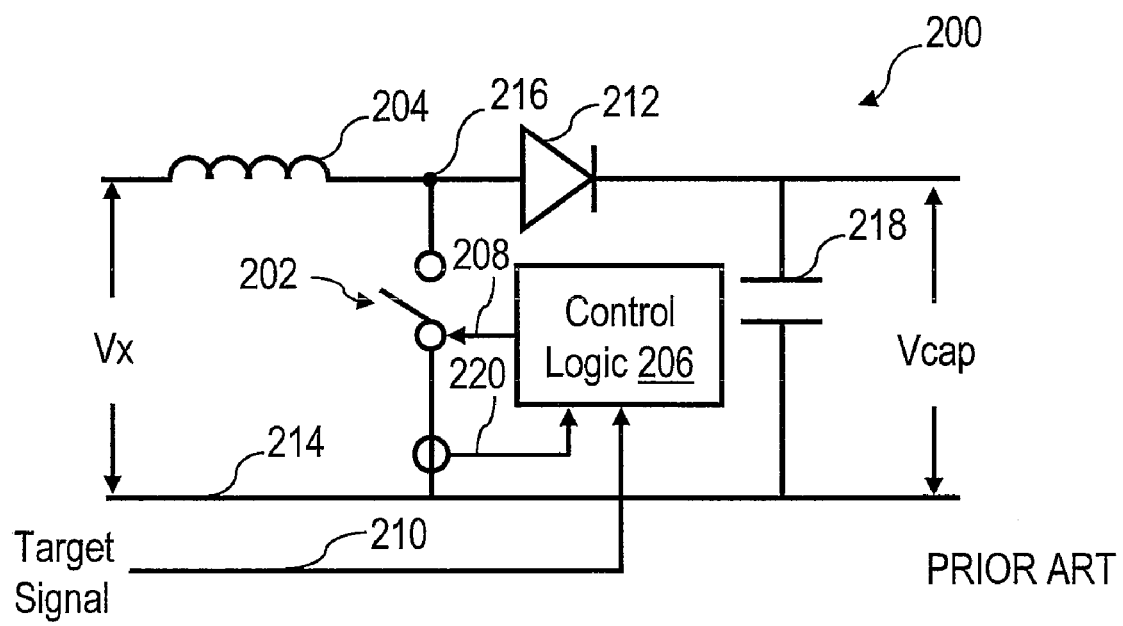
FIG. 2A is a schematic diagram of a prior art boost-mode switching regulator.
Figure 2B:
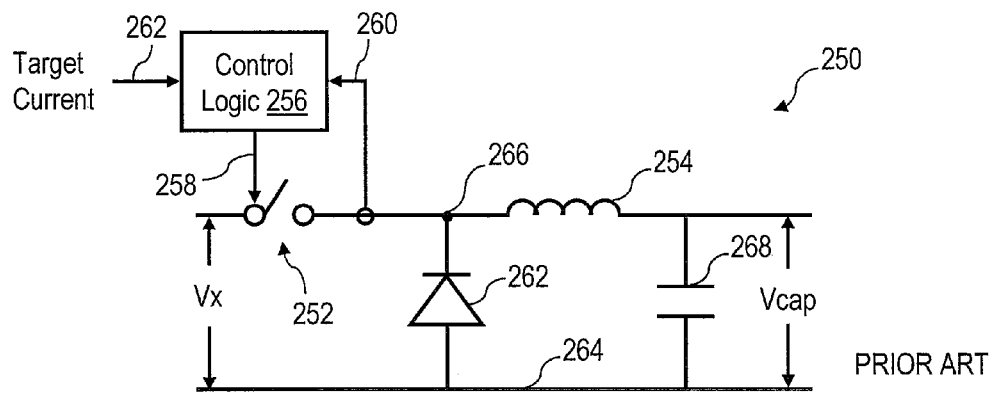
FIG. 2B is a schematic diagram of a prior art buck-mode switching regulator.
Figure 4:
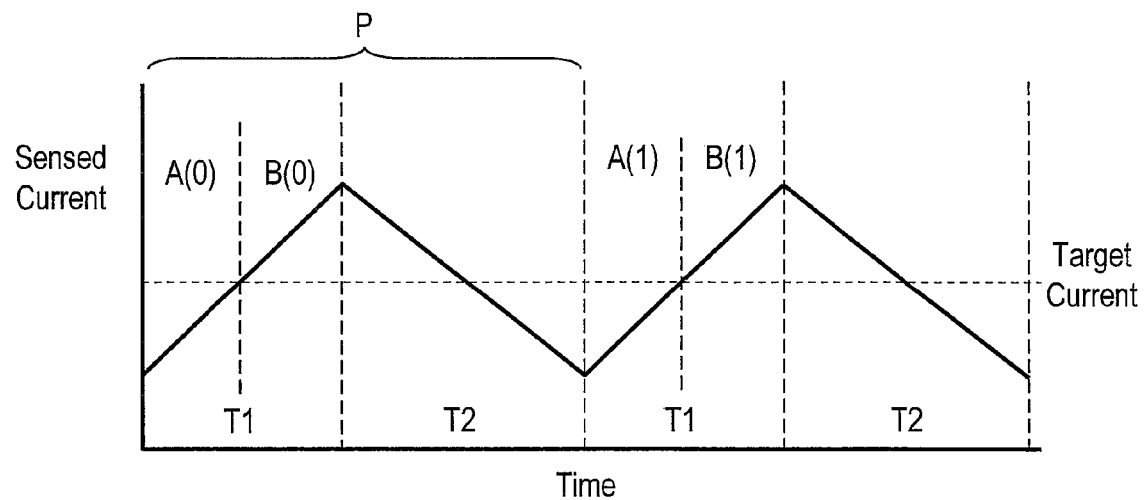
FIG. 4 is a timing diagram of the operation of a controlled system in accordance with the present invention.

Referring now to FIG. 4, there is depicted a timing diagram of the operation of an embodiment of a controlled system 300 in accordance with the present invention. In the depicted timing diagram, sensed signal 312 is a sensed current, for example, the current sensed at the output of switch 304, as shown in FIGS. 2A-2B, and the target is a target current. Of course, in alternative embodiments, sensed signal 312 and the target signal may both be voltages.

In FIG. 4, sensed signal 312, which is either rising or falling at all times, has repeating cycles of period P each comprising an interval T1 in which sensed signal 312 is rising and an interval T2 in which sensed signal 312 is falling. Each interval T1 in turn comprises an interval A during which sensed signal 312 rises from a cycle initial value to the target current and a subsequent interval B during which sensed signal 312 rises from the target current to a cycle maximum value. Sensed signal 312 falls from the cycle maximum value to the initial value of the next cycle during interval T2. For clarity, intervals A and B are identified with ascending numerical cycle indices (A(0), A(1), etc. and B(0), B(1), etc.).

In accordance with the present invention, time-based controller 310 can control switch 304 to implement any of a number of time-based control methodologies. For example, time-based controller 310 can implement constant period control so that period P is constant (and intervals T1 and T2 vary between cycles), or constant on-time control so that interval T1 is constant (and period P and interval T2 vary between cycles), or constant off-time control so that interval T2 is constant (and period P and interval T1 vary between cycles). A desired methodology may be selected, for example, to reduce electromagnetic interference (EMI) with surrounding circuitry.

The simplest control methodology, which also enables an immediate lock to the target signal, is a constant on-time or constant off-time approach in which one of intervals T1 or T2 is of constant duration and the other interval (and period P) varies in duration. In a constant off-time control methodology, time-based controller 310 controls switch 304 such that the interval A of interval T1 during which the sensed signal is less than the target and the interval B of interval T1 during which the sensed signal is greater than the target are equal. According to this constant off-time control methodology, the duration of interval B for each cycle is determined in accordance with the following equation:

$$B(N) = [B(N-1) + A(N)]/2,$$

where N is the cycle index. Thus, for example, utilizing this equation, time interval B(1) is equal to the average of time intervals B(0) and A(1). Interval T2 is, of course, fixed in duration.

The constant on-time control methodology employs the same equation as the constant off-time approach, except that in the constant on-time approach interval T1 is of constant duration, interval A is the portion of interval T2 in which the sensed signal exceeds the target, and interval B is the portion of interval T2 in which the sensed signal is less than the target. Time-based controlled 310 again controls switch 304 such that intervals A and B are of equal duration.

As described below with reference to FIGS. 5-6, time-based controller 310 implements the constant on-time and constant off-time methodologies by setting switch 304 to a first state, measuring the duration of interval A, and then changing the state of switch 304 at the end of an interval B equal in duration to interval A. If the time the sensed signal exceeds the target signal is equal to the time the sensed signal is less than the target signal, then the average of the sensed signal must be perfectly equal to the desired target.

The constant-period control methodology is a slightly more complex control methodology that applies the same general time-based control approach. If the period P, which is the sum of T1 and T2, is constant, then the duty cycle D can be expressed as:

$$D=T1/P=(A+B)/P.$$

If P is defined to have a duration of 1, then:

$$D=A+B;$$

$$Dest(N)=D(N-1)+(A(N)-A(N-1))/(1+A(N)-A(N-1))(1-D(N-1));\text{ and}$$

$$B(N)=Dest(N)-A(N)+(A(N)-\tfrac{1}{2}Dest(N))(1-Dest(N)).$$

Thus, the calculation of the B times can be generalized to a low-pass filtering of the A times. This formulation, which can be generalized to cover all cases, is especially useful when noise is induced in the measurement of the A times. Smoother, more consistent time result, at the expense of a slightly slower transient response.

Figure 5:
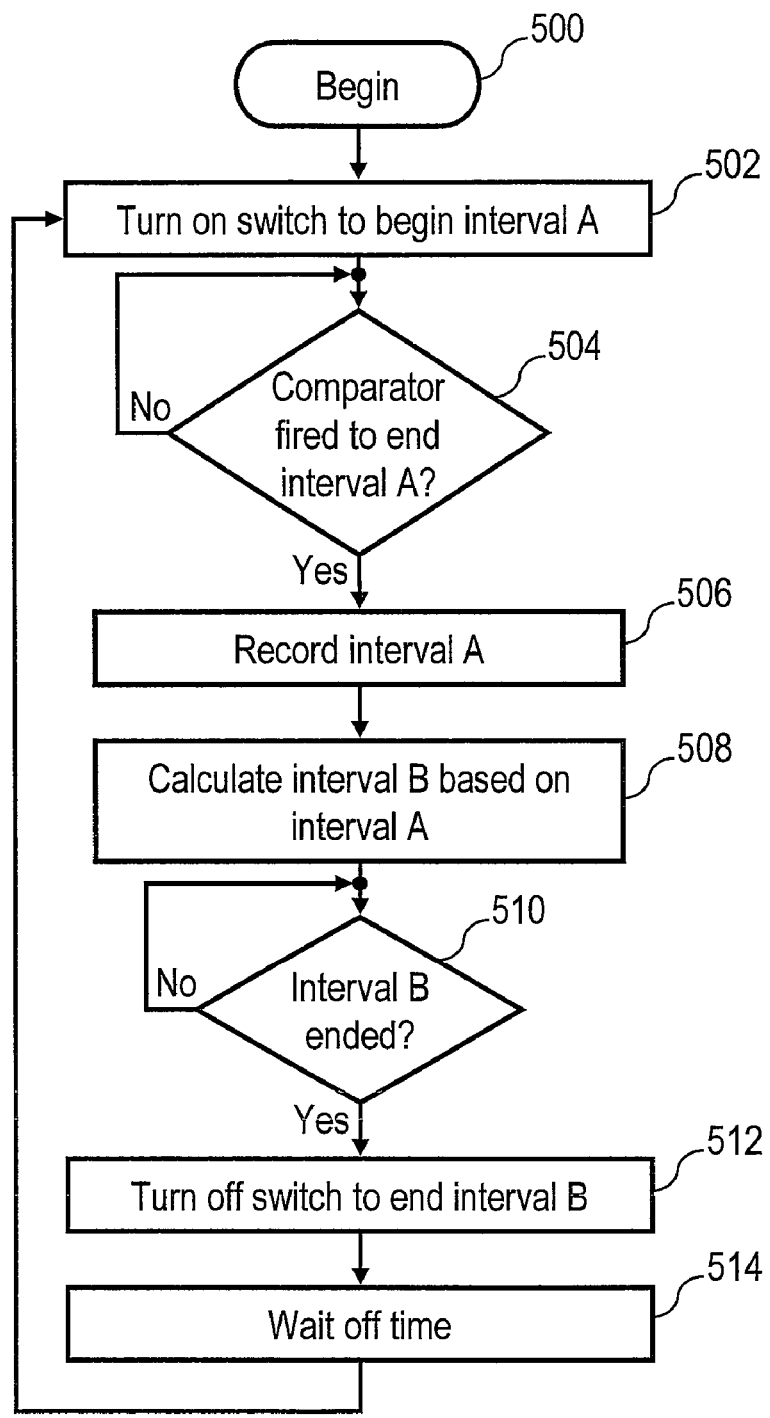
FIG. 5 is a high level logical flowchart of the operation of a digital implementation of the time-based controller of FIG. 3.

With reference now to FIG. 5, there is illustrated a high level logical flowchart of the operation of a digital implementation of the time-based controller 310 of FIG. 3. The illustrated process can be implemented by an application specific integrated circuit (ASIC), general purpose digital hardware executing program code from a tangible data storage medium that directs the illustrated operations, or other digital circuitry, as is known in the art. Further, the illustrated process can be utilized to implement any of the time-based constant period, time-based constant off-time, time-based variable period, or time-based variable off-time control methodologies.

The process shown in FIG. 5 begins at block 500 and then proceeds to block 502, which depicts time-based controller 310 asserting control signal 330 (e.g., placing control signal 330 in a first state) to turn on switch 304 and thus begin interval A. Next, the process iterates at block 504 until comparator 318 indicates that interval A has ended by signaling that the value of sensed signal 312 has crossed the value of reference signal 314 in this case, in a positive transition. The change in relative magnitudes of reference signal 314 and sensed signal 312 thus causes a polarity change in the output of comparator 318 indicating (in this embodiment) that sensed signal 312 is at least as great as reference signal 314 (or in other embodiments, that sensed signal 312 is equal to or less than reference signal 314). In response to comparator 318 indicating that sensed signal 312 has crossed reference signal 314 in a positive transition, time calculation logic 322 records the duration of interval A (block 506) based upon the value of a digital counter or timer. Time calculation logic 322 then calculates the duration of interval B, for example, utilizing one of the formulas set forth above (block 508).

As shown at blocks 510 and 512, pulse width modulator 324 then detects (e.g., utilizing a digital counter or timer) when the calculated duration of interval B has elapsed from the time comparator 318 indicated the end of interval A. In response to a determination that the calculated duration of interval B has elapsed, pulse width modulator 324 deasserts control signal 330 (e.g., places control signal 330 in a second state) to turn off switch 304. Pulse width modulator 324 thereafter waits a fixed or variable off time (interval T2) in accordance with the selected control methodology (block 514) and again asserts the control signal 330 to turn on switch 304 and begin interval A of a next cycle of operation, as shown in block 502. The process thereafter proceeds as has been described.

Figure 6:
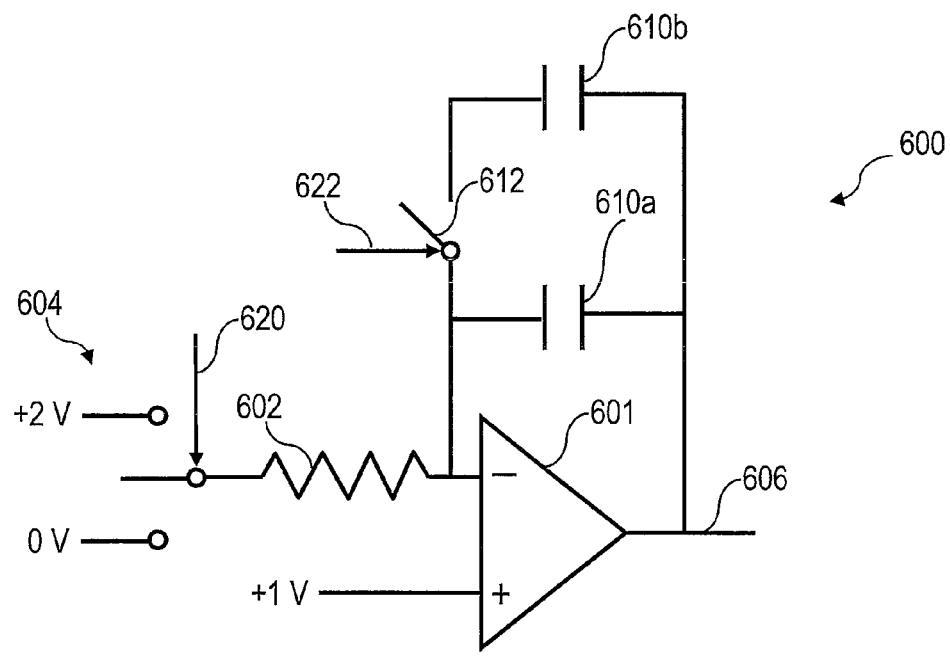
FIG. 6 is a schematic diagram of an analog implementation of the time-based controller of FIG. 3.

With reference now to FIG. 6, there is illustrated an alternative implementation of time calculation logic 322 in time-based controller 310 of FIG. 3 utilizing an analog circuit 600. It should be appreciated that the exemplary analog circuit 600 is but one of a number of different possible analog implementations.

In the depicted analog embodiment, analog circuit 600 is an op-amp integrator including an op-amp 601 having a positive input, a negative input and an op-amp output 606. A first reference voltage (e.g., 1 V DC) is coupled to the positive input of op-amp 601, and a resistor 602 is connected to the negative input of op-amp 601. Resistor 602 is further connected to a first switch 604 that connects resistor 602 to a second reference voltage (e.g., 0V DC) that causes op-amp 601 to integrate down, or connects op-amp 601 to a third reference voltage (e.g., 2V DC) that causes op-amp 601 to integrate up, or is open. Coupled between op-amp output 606 and the negative input of op-amp 601 is a capacitive feedback loop including parallel capacitors 610a and 610b, each having a capacitance C. Capacitor 610b is connected in series with a second switch 612.

First switch 604 is controlled by control signal 620, which causes op-amp 601 to integrate up during interval A by connecting switch 604 to the third reference voltage (e.g., 2V DC), to integrate down during interval B by connecting switch 604 to the second reference voltage (e.g., 0V DC), and to be inactive during the remainder of the cycle by connecting placing switch 604 in its open state. During intervals A and B in which op-amp 601 is integrating, the voltage of op-amp output 606 is given by:

$$V_{out} = -\frac{1}{RC_{eff}}\int_0^t V_{in}dt + V_{initial}$$

where $V_{initial}$ is the output voltage of the integrator at time t=0 and $C_{eff}$ is equal to 2C when switch 612 is closed and equal to C when switch 612 is open.

In order to provide "memory" of the duration of interval A, switch 612 is controlled by control signal 622 so that switch 612 is closed and capacitor 610b is connected during interval A and switch 612 is open and capacitor 610b is disconnected during interval B. As a result, the duration of interval A is converted by the integration performed by op-amp 601 into a voltage stored on capacitor 610b. This voltage is subsequently converted back into a time by the integration of op-amp 601 to compute:

$$B(N)=[B(N-1)+A(N)]/2,$$

where B(N) is indicated by the voltage of op-amp output 606, B(N−1) is $V_{initial}$, and A(N) is indicated by the voltage of capacitor 610b.

As has been described, in some embodiments of the invention time-based bang-bang control is applied to a switched controlled system having an integrating response. In at least some embodiments, the controlled system is controlled so that the duration of an interval that a sensed signal (e.g., a voltage or current signal) exceeds a target is equal to a duration of an interval that the sensed signal is less than the target. Because the time the sensed signal exceeds the target is equal to the time the sensed signal is less than the target, the average of the sensed signal must be equal to the desired target.

While the present invention has been particularly shown as described with reference to one or more preferred embodiments, it will be understood by those skilled in the art that various changes in form and detail may be made therein without departing from the spirit and scope of the invention. For example, while the present invention describes various signals and values as "positive" and "negative", those skilled in the art will appreciate that, in at least some embodiments, such designations can be interchanged without change in the essential operation of the described control systems.

What is claimed is:

1. A time-based controller for a controlled system including a plant having an integration response, said time-based controller comprising:
    a comparator that, while a control signal supplied to the plant has a first state, detects, at a first time, a polarity change in a comparison of a sensed signal from the plant and a reference signal;
    time calculation logic that, based upon the first time, determines a second time at which to change a state of a control signal supplied to the plant; and
    a modulator that, at the determined second time, changes the state of the control signal supplied to the plant from the first state to a second state.

2. The time-based controller of claim 1, wherein said time-based controller fixes a period of the control signal at a constant duration.

3. The time-based controller of claim 1, wherein the time calculation logic determines the second time based upon a measured duration of a first interval terminated at the first time and a previous duration of a second interval terminated by a change in the state of the control signal.

4. The time-based controller of claim 3, wherein said time-based controller fixes said first interval or said second interval at a constant duration.

5. The time-based controller of claim 3, wherein the time calculation logic determines the second time by averaging the durations of the first and second intervals.

6. The time-based controller of claim 1, wherein said reference signal is indicative of a desired average value for the sensed signal.

7. The time-based controller of claim 6, wherein said time-based controller controls the sensed signal so that a duration of a first interval in which the sensed signal exceeds a target value is equal to a duration of a second interval in which the sensed signal is less than the target value.

8. The time-based controller of claim 1, wherein the time calculation logic detects arrival of the second time by reference to a digital counter.

9. The time-based controller of claim 1, wherein the time calculation logic detects arrival of the second time utilizing a timer.

10. The time-based controller of claim 1, wherein said time-based controller comprises digital circuitry.

11. The time-based controller of claim 1, wherein said time-based controller comprises analog circuitry.

12. A controlled system, comprising:
    the time-based controller of claim 1; and
    the plant having the integration response, wherein the plant is communicatively coupled to the time-based controller by the sensed signal and the control signal.

13. A method of time-based control for a controlled system including a plant having an integration response, said method comprising:
    while a control signal supplied to the plant is in a first state, detecting at a first time a polarity change in a comparison of a sensed signal from the plant and a reference signal;
    based upon the first time, determining a second time at which to change a state of a control signal supplied to the plant; and
    at the determined second time, changing the state of the control signal supplied to the plant from the first state to a second state.

14. The method of claim 13, and further comprising fixing a period of the control signal at a constant duration.

15. The method of claim 13, wherein determining the second time comprises determines the second time based upon a measured duration of a first interval terminated at the first time and a previous duration of a second interval terminated by a change in the state of the control signal.

16. The method of claim 15, and further comprising fixing said first interval or said second interval at a constant duration.

17. The method of claim 15, wherein determining the second time comprises averaging the durations of the first and second intervals.

18. The method of claim 13, wherein said reference signal is indicative of a desired average value for the sensed signal.

19. The method of claim 18, wherein changing the state of the control signal comprises periodically changing the state of the control signal so that a duration of a first interval in which the sensed signal exceeds a target value is equal to a duration of a second interval in which the sensed signal is less than the target value.

20. A program product, comprising:
    a tangible data storage medium; and
    program code stored within the tangible data storage medium that causes digital circuitry to implement time-based control for an integrator by detecting, at a first time, a polarity change in a comparison of a sensed signal from the plant and a reference signal while a control signal supplied to the plant is in a first state, determining, based upon the first time, a second time at which to change a state of a control signal supplied to the plant, and changing the state of the control signal supplied to the plant from the first state to a second state at the determined second time.

21. The program product of claim 20, wherein the program code causes the digital circuitry to determine the second time based upon a measured duration of a first interval terminated at the first time and a previous duration of a second interval terminated by a change in the state of the control signal.

22. The program product of claim 21, wherein the program code causes the digital circuitry to determine the second time by averaging the durations of the first and second intervals.

23. The program product of claim 20, wherein said reference signal is indicative of a desired average value for the sensed signal.

24. The program product of claim 23, wherein said program code causes the digital circuitry to control the sensed signal so that a duration of a first interval in which the sensed signal exceeds a target value is equal to a duration of a second interval in which the sensed signal is less than the target value.

* * * * *